US010259593B2

(12) United States Patent
Tian et al.

(10) Patent No.: US 10,259,593 B2
(45) Date of Patent: Apr. 16, 2019

(54) OBSTACLE AVOIDANCE DEVICE

(71) Applicant: Haoxiang Electric Energy (Kunshan) Co., Ltd., Kunshan, Jiangsu (CN)

(72) Inventors: Yu Tian, Jiangsu (CN); Wenyan Jiang, Jiangsu (CN)

(73) Assignee: Haoxiang Electric Energy (Kunshan) Co., Ltd., Kunshan, Jiangsu (CN)

( * ) Notice: Subject to any disclaimer, the term of this patent is extended or adjusted under 35 U.S.C. 154(b) by 0 days.

(21) Appl. No.: 15/703,986

(22) Filed: Sep. 14, 2017

(65) Prior Publication Data

US 2018/0002036 A1    Jan. 4, 2018

(30) Foreign Application Priority Data

Dec. 26, 2016    (CN) .................... 2006 2 1440413 U
Dec. 26, 2016    (CN) .......................... 2016 1 1223341

(51) Int. Cl.

| | |
|---|---|
| *B64D 47/08* | (2006.01) |
| *H04N 5/232* | (2006.01) |
| *B64C 39/02* | (2006.01) |
| *F16M 11/10* | (2006.01) |
| *G03B 17/56* | (2006.01) |
| *G05D 1/00* | (2006.01) |
| *G03B 15/00* | (2006.01) |

(52) U.S. Cl.
CPC ............ *B64D 47/08* (2013.01); *B64C 39/024* (2013.01); *F16M 11/10* (2013.01); *G03B 15/006* (2013.01); *G03B 17/561* (2013.01); *G05D 1/0038* (2013.01); *G05D 1/0094* (2013.01); *H04N 5/2328* (2013.01); *B64C 2201/127* (2013.01); *F16M 2200/04* (2013.01)

(58) Field of Classification Search
USPC ........... 396/55, 143, 427, 428; 348/144, 143
See application file for complete search history.

(56) References Cited

U.S. PATENT DOCUMENTS

| | | | | |
|---|---|---|---|---|
| 8,446,468 | B1 * | 5/2013 | Medioni ............ | G06K 9/00791 348/144 |
| 2008/0042812 | A1 * | 2/2008 | Dunsmoir .......... | G06K 9/00805 340/435 |
| 2009/0207250 | A1 * | 8/2009 | Bennett ................ | F16M 11/105 348/144 |
| 2012/0197461 | A1 * | 8/2012 | Barrows .............. | G05D 1/0858 701/1 |
| 2014/0327733 | A1 * | 11/2014 | Wagreich ............... | H04N 7/185 348/37 |
| 2015/0097951 | A1 * | 4/2015 | Barrows ............ | H04N 5/35572 348/144 |

(Continued)

*Primary Examiner* — Clayton E. LaBalle
*Assistant Examiner* — Warren K Fenwick

(57) ABSTRACT

An obstacle avoidance device for detecting surroundings of an unmanned mobile device is disclosed, which includes a stabilization platform connected with the unmanned mobile device, wherein the stabilization platform includes a stabilizer for ensuring stably bearing at least one platform camera; and an obstacle avoidance module fixed with the stabilization platform, so as to reduce interferences to detecting the surroundings by the obstacle avoidance module when the unmanned mobile device acts. The obstacle avoidance device of the present invention is able to keep a stable attitude while the unmanned mobile device is unstable and changes an attitude thereof, so as to effectively avoid obstacles.

8 Claims, 3 Drawing Sheets

(56) References Cited

U.S. PATENT DOCUMENTS

| | | | |
|---|---|---|---|
| 2015/0346722 A1* | 12/2015 | Herz | G05D 1/0038 |
| | | | 701/2 |
| 2016/0127641 A1* | 5/2016 | Gove | G06T 1/0007 |
| | | | 348/143 |
| 2018/0024422 A1* | 1/2018 | Ye | G03B 17/561 |
| | | | 396/428 |
| 2018/0077918 A1* | 3/2018 | Yu | A01M 5/02 |
| 2018/0194490 A1* | 7/2018 | Chen | B64D 47/08 |

* cited by examiner

OBSTACLE AVOIDANCE DEVICE

CROSS REFERENCE OF RELATED APPLICATION

The present invention claims priority under 35 U.S.C. 119(a-d) to CN 201611223341.0, filed Dec. 26, 2016; and CN 200621440413.2, filed Dec. 26, 2016.

BACKGROUND OF THE PRESENT INVENTION

Field of Invention

The present invention relates to an obstacle avoidance technology, and more particularly to an obstacle avoidance device.

Description of Related Arts

The UAV (unmanned aerial vehicle) vision navigation system has technical characteristics of real-time modeling, autonomous positioning and navigation in a complex unknown flight environment. Through being equipped with the visible light camera, the infrared camera, the laser rangefinder and other sensors, the UAV platform can simultaneously collect multidimensional flight environment information; interact data with ground station and collaboratively compute framework through an airborne processor, to real-time reconstruct a three-dimensional model of an unknown flight environment, so as to achieve self-positioning, autonomous visional obstacle avoidance, tracking and landing without any external positioning devices (such as GPS), which is widely applied to the environment reconnaissance, monitoring and detection, disaster scene search and rescue of the unknown flight in the complex communication environment.

Currently, the visual obstacle avoidance systems applied to the UAV are mostly in a single direction, such as application of the visual barrier system is a single direction, such as DJI Elf 4, YUNEEC TyphoonH and other products.

The above obstacle avoidance programs adopt that the optical sensor is fixed onto an aircraft body of the UAV, which has two drawbacks as follows. Firstly, the aircraft body of the UAV has big vibrations, which causes that the optical image information collected by the sensor also correspondingly shakes at high frequency, so that the obstacle avoidance lens with high resolution is unable to be applied, thus it is difficult to distinguish very small obstacles, such as wires. Secondly, the attitude will change during the flight, so that the lens of the obstacle avoidance module is unable to always aim at the plane of the flight direction, thereby the obstacle avoidance is unable to be achieved. The traditional method to solve the above problems is to limit the attitude change angle of the UAV in the course of movement, that is, to limit the flight speed of the UAV, resulting in poor flight experience, and also unable to achieve the obstacle avoidance in the case of body vibration.

SUMMARY OF THE PRESENT INVENTION

A technical problem of the present invention to be solved is to provide an obstacle avoidance device, which is able to keep a stable attitude while an unmanned mobile device is unstable and changes an attitude thereof, so as to effectively avoid obstacles.

To solve the above problem, the present invention provides an obstacle avoidance device for detecting surroundings of an unmanned mobile device, which comprises:

a stabilization platform connected with the unmanned mobile device, which comprises a stabilizer for ensuring stably bearing at least one platform camera; and an obstacle avoidance module fixed with the stabilization platform, so as to reduce interferences to detecting the surroundings by the obstacle avoidance module when the unmanned mobile device acts.

Preferably, the stabilization platform comprises a rotation shaft unit and a stabilization holder; the obstacle avoidance module is installed on the stabilization holder; the stabilization holder is movably connected with the unmanned mobile device through the rotation shaft unit, so that the obstacle avoidance module moves relatively to the unmanned mobile device and maintains the attitude when the unmanned mobile device acts.

Preferably, through the rotation shaft unit, the stabilization holder rotates in three mutually perpendicular planes, or two mutually perpendicular planes, or in a single plane.

Preferably, the stabilization holder, as an outermost part of the stabilization platform, is circularly around the rotation shaft unit.

Preferably, the stabilization holder comprises a frame structure with a gap, and the gap is configured to accommodate the platform camera.

Preferably, through a camera shaft, the platform camera is rotatably connected with the gap of the frame structure.

Preferably, one shaft of the rotation shaft unit and a frame plane of the frame structure are coplanar, the frame structure rotates around an axis of the coplanar plane.

Preferably, a camera axis is parallel to one axis of the rotation shaft unit.

Preferably, attitudes of the platform camera and the obstacle avoidance module are independently controlled.

Preferably, the obstacle avoidance module comprises a circumferential obstacle avoidance lens unit which is arranged at a periphery of the stabilization holder and faces towards an outside of the stabilization holder, so as to achieve omnidirectional obstacle avoidance.

Preferably, the circumferential obstacle avoidance lens unit comprises four pairs of binocular lenses which are respectively evenly distributed in each direction of the periphery of the stabilization holder.

Preferably, the obstacle avoidance module further comprises bottom obstacle avoidance lenses which are arranged at a bottom of the stabilization holder and faces downwardly, so as to achieve bottom obstacle avoidance.

Preferably, the unmanned mobile device is a UAV (unmanned aerial vehicle).

After adopting the above technical solutions, compared with the prior art, the present invention has beneficial effects as follows.

The obstacle avoidance module is installed on the stabilization platform to enhance the stability of the obstacle avoidance module; and no matter how the unmanned mobile device acts, it is maintained that the obstacle avoidance module stably faces towards one direction, so that images collected by the obstacle avoidance module are more stable. Therefore, an optical lens with a higher resolution is used to clearly distinguish smaller obstacles, thus more effectively avoiding obstacles and constraining an action of the unmanned mobile device no longer.

The platform camera and the obstacle avoidance module are simultaneously installed on the stabilization holder, such that the stabilization platform becomes a shared structure, so as to save the installation space and cost. Furthermore, the platform camera is rotatably installed to the gap of the frame structure of the stabilization holder, which means that a shaft is added to the stabilization platform; while rotating within the gap, the platform camera will not be blocked by the stabilization holder during the shooting process at any angles, which makes the shooting angle less restricted.

Figure 1:
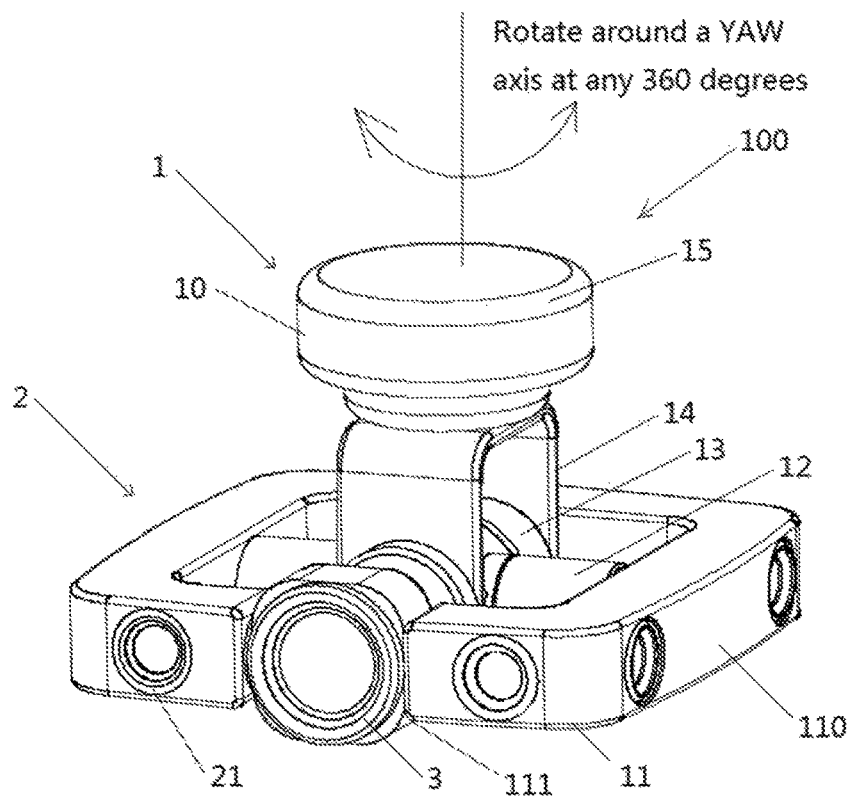
FIG. 1 is a three-dimensionally structural diagram of an obstacle avoidance device at a first rotation state according to a preferred embodiment of the present invention.
Figure 2:
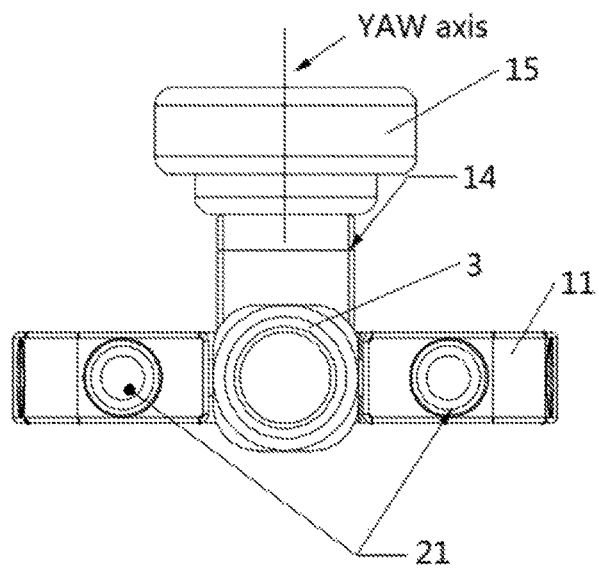
FIG. 2 is a front view of the obstacle avoidance device in FIG. 1.

In the drawings, 1: stabilization platform; 2: obstacle avoidance module; 3: platform camera; 10: stabilizer; 11: stabilization holder; 12: X shaft arm; 13: Z shaft arm; 14: Y shaft arm; 15: connection part; 21: circumferential obstacle avoidance lens unit; 22: bottom obstacle avoidance lens; 30: camera shaft; 100: obstacle avoidance device; 110: frame structure; 111: gap.

DETAILED DESCRIPTION OF THE PREFERRED EMBODIMENT

To more obviously understand the foregoing objects, features and advantages of the present invention, the specific embodiments of the present invention will be described in detail with reference to the accompanying drawings as follows.

Many specific details are set forth in the following description to facilitate a thorough understanding of the present invention. The present invention is able to be embodied in many other ways different from those described herein, those skilled in the art will be able to make similar generalizations without departing from the spirit of the present invention. Therefore, the present invention is not limited to the specific embodiments disclosed below.

Referring to FIGS. 1-6, an obstacle avoidance device 100 according to a preferred embodiment of the present invention is illustrated, which comprises a stabilization platform 1 and an obstacle avoidance module 2 and is adapted for detecting surroundings of an unmanned mobile device. The stabilization platform 1 is also called as self-stabilization platform and refers to a platform with stability enhancement function, and the platform comprises a stabilizer, such that when the unmanned mobile device freely moves, the stabilizer maintains that an attitude of the stabilized object relative to ground is unchanged.

In the present embodiment, the stabilization platform 1 is connected with the unmanned mobile device (not shown in the drawings), the obstacle avoidance module 2 is installed on the stabilization platform 1; that is, the obstacle avoidance module 2 is indirectly connected with the unmanned mobile device through the stabilization platform 1, and is able to freely rotate relatively to the unmanned mobile device through the stabilization platform 1. The stabilizer is configured to keep detection stability of the obstacle avoidance module 2 and shooting stability of a platform camera 3. When the unmanned mobile device acts, a stability of the obstacle avoidance module 2 is enhanced through the stabilization platform 1; when the unmanned mobile device vibrates or arbitrarily changes the attitude, the stabilization platform 1 correspondingly flexibly moves to maintain the obstacle avoidance module 2 in a stable attitude, so as to reduce interferences to detecting the surroundings by the obstacle avoidance module 2 when the unmanned mobile device acts.

The obstacle avoidance module 2 is installed on the stabilization platform 1 to enhance the stability of the obstacle avoidance module 2; and no matter how the unmanned mobile device acts, it is maintained that the obstacle avoidance module 2 stably faces towards one direction, so that images collected by the obstacle avoidance module 2 are more stable. Therefore, an optical lens with a higher resolution is used to clearly distinguish smaller obstacles, thus more effectively avoiding obstacles and constraining an action of the unmanned mobile device no longer.

In one embodiment, the unmanned mobile device is a UAV (unmanned aerial vehicle), that is, the obstacle avoidance module 2 is firstly installed on the stabilization platform 1, and then installed on the UAV, so that the obstacle avoidance of the whole UAV is achieved. Compared with the prior art that the obstacle avoidance module is directly installed on an aircraft body of the UAV, no matter how the aircraft body of the UAV vibrates or how the attitude of the UAV changes, the obstacle avoidance module 2 of the present invention remains stable through the stabilization platform 1, and is always stable on a plane along a flight direction, so as to distinguish very small obstacles for avoiding obstacles when the UAV flies. Furthermore, an attitude change angle or a flight speed of the UAV is not limited during the flight. Therefore, the flight experience is better. However, the unmanned mobile device is not limited to be the UAV, and is also able to be a robot and so on.

The obstacle avoidance module 2 is able to be an obstacle avoidance sensor, such as an infrared obstacle avoidance sensor, a laser distance measuring sensor and an ultrasonic distance measuring sensor, and preferably, an optical sensor; the stabilization platform 1 is able to ensure that the optical lens faces towards one direction.

In one embodiment, the stabilization platform 1 comprises a rotation shaft unit and a stabilization holder 11. The obstacle avoidance module 2 is installed on the stabilization holder 11, and the stabilization holder 11 is movably connected with the unmanned mobile device through the rotation shaft unit. The stabilization holder 11 makes a strain movement via the rotation shaft unit through the stabilizer, so that the obstacle avoidance module 2 moves relatively to the unmanned mobile device and maintains the attitude when the unmanned mobile device acts.

How many axes the stabilization holder 11 specifically moves around is determined as required. In one embodiment, through the rotation shaft unit, the stabilization holder 11 rotates in three mutually perpendicular planes, or two mutually perpendicular planes, or in a single plane, that is, the rotation shaft unit comprises three shafts, or two shafts or a single shaft; when there are two or more shafts, the shafts are perpendicular to each other. Preferably, the rotation shaft unit comprises three shafts, so that the stabilization holder 11 makes a strain movement in all directions so as to be adjusted to a stable attitude.

As shown in FIGS. 1-6, the rotation shaft unit comprises an X shaft arm 12, a Z shaft arm 13, a Y shaft arm 14 and a connection part 15, wherein the connection part 15 is connected with the unmanned mobile device, a relative rotation between the connection part 15 and the Y shaft arm 14 allows the stabilization holder 11 to rotate around a YAW axis at any 360 degrees, a relative rotation between the Y shaft arm 14 and the Z shaft arm 13 allows the stabilization holder 11 to rotate around a ROLL axis within a certain range, a relative rotation between the Z shaft arm 13 and the X shaft arm 12 allows the stabilization holder 11 to rotate around a PITCH1 axis within a certain range; a motor for driving rotation in all directions is located within the stabilization platform 1, a driving rotation mode of the motor is the prior art and will not be repeated here. It should be understood that the stabilization platform 1 is able to comprise one shaft or two shafts, so that rotation orientations of the stabilization holder 11 are reduced accordingly, thus it is only required that the stability is adjusted in these orientations according to the action of the unmanned mobile device.

In one embodiment, the stabilization holder 11, as an outermost part of the stabilization platform 1, is circularly around the rotation shaft unit; any rotations of the rotation shaft unit occur inside the stabilization holder 11, which will not interfere with the obstacle avoidance module 2 on the stabilization holder 11 and the shooting of the platform camera 3, thereby enlarging an installable space and a detectable range of the obstacle avoidance module 2.

In one embodiment, referring to FIGS. 1-6, the stabilization holder 11 comprises a frame structure 110 with a gap 111, wherein the gap is configured to accommodate the platform camera 3. The platform camera 3 is rotatably connected with the gap of the stabilization holder 11 through a camera shaft 30; that is, the platform camera 3 and the obstacle avoidance module 2 are simultaneously installed on the stabilization holder 11, such that the stabilization platform 1 becomes a shared structure, so as to save the installation space and cost. Furthermore, the platform camera 3 is rotatably installed to the gap 111 of the frame structure 110 of the stabilization holder 11, which means that a shaft is added to the stabilization platform 1; while rotating within the gap, the platform camera 3 will not be blocked by the stabilization holder 11 during the shooting process at any angles, which makes the shooting angle less restricted.

Referring to FIGS. 1-6, the stabilization platform 1 has four axes, that is, the YAW axis, the ROLL axis, the PITCH1 axis and the PITCH2 axis; the stabilization holder 11 rotates around the YAW axis, the ROLL axis and the PITCH1 axis; the platform camera 3 is rotatably connected with the camera shaft whose axis is the PITCH2 axis, so that the platform camera 3 rotates around the four axes, so as to obtain a higher freedom degree.

Figure 3:
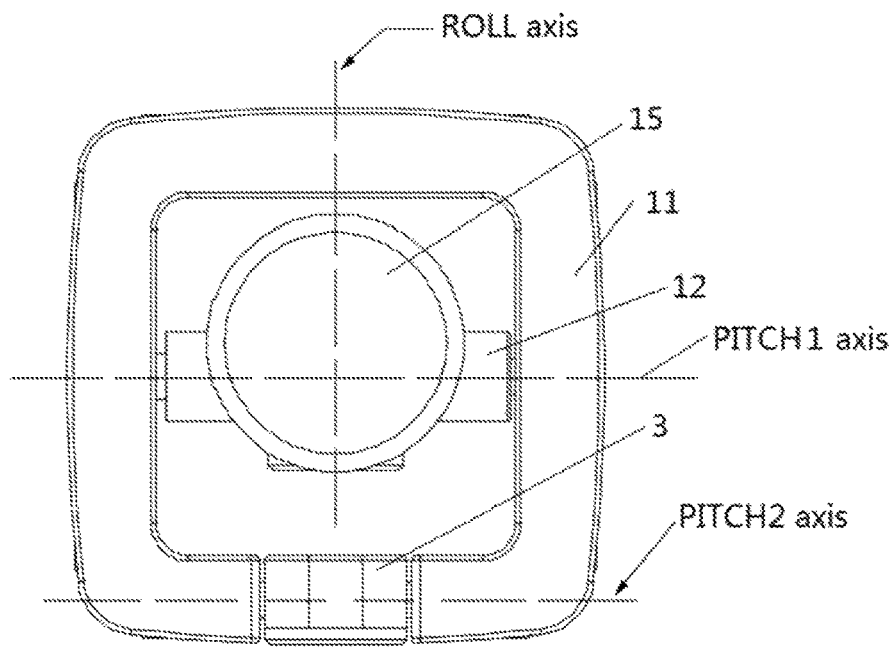
FIG. 3 is a top view of the obstacle avoidance device in FIG. 1.

Preferably, a camera axis is parallel to one axis of the rotation shaft unit. Referring to FIG. 3, the camera axis PITCH2 is parallel to the PITCH1 axis of the rotation shaft unit, so that when there is a derivation in a rotation direction of the rotation shaft unit rotating around the PITCH1 axis, an inclined angle of the platform camera 3 is used to detect the derivation. Moreover, the platform camera 3 rotates around the camera axis PITCH2 at a certain angle to avoid the inclined angle, thereby ensuring normal shooting vision of the platform camera 3.

It should be understood that a shape of the stabilization holder 11 is not limited to be the description mentioned above, which is able to be round; or there is no gap in the stabilization holder 11, the platform camera 3 is installed on the stabilization holder 11, as long as the platform camera 3 is able to shoot, or the rotational shooting within a certain angle range is made when a bigger shooting vision is needed.

In one embodiment, one shaft (the X shaft arm 12) of the rotation shaft unit and the frame plane of the stabilization holder 11 are coplanar, the stabilization holder 11 rotates around an axis of the coplanar plane; and preferably, two ends of the X shaft arm 12 are respectively connected with two opposite non-gaped frame sides of the stabilization holder 11, and a middle of the two opposite non-gaped frame sides of the stabilization holder 11 is the best, so as to reduce the rotation space and the rotation amplitude of the stabilization holder 11, thus the stability is enhanced.

In one embodiment, the attitudes of the platform camera 3 and the obstacle avoidance module 2 are independently controlled. In the case of sharing a stabilization platform, the platform camera 3 and the obstacle avoidance module 2 are still independently controlled through a conventional control method, which is convenient for being achieved.

In one embodiment, referring to FIGS. 1, 2, 5 and 6, the obstacle avoidance module 2 comprises a circumferential obstacle avoidance lens unit 21 which is arranged at a periphery of the stabilization holder 11 and faces towards an outside of the stabilization holder 11; the circumferential obstacle avoidance lens unit 21 comprises multiple obstacle avoidance lenses which are distributed in each direction of the periphery of the stabilization holder 11 to achieve omnidirectional obstacle avoidance. Preferably, the circumferential obstacle avoidance lens unit 21 comprises four pairs of binocular lenses which are respectively evenly distributed in each direction of the periphery of the stabilization holder 11. Of course, more lenses are able to be arranged. The stabilization holder 11 has a four-side frame structure 110, and the lenses are distributed at every frame side, so that the obstacles are able to be detected in every direction, so as to achieve the omnidirectional obstacle avoidance. The existing obstacle avoidance module is only able to detect one direction, usually only able to detect obstacles in front thereof; if the surroundings need to be detected, it is necessary to control the rotation detected locations, which is more trouble in control to result in unstable interferences, and is unable to simultaneously detect the surroundings in every direction. In this embodiment, the binocular lenses are set at the periphery of the stabilization holder 11, there is no need to control the rotation detected locations, the present invention stays in a static state to detect the surroundings at all times, so as to achieve simultaneous omnidirectional obstacle detection. The binocular lenses are similar to human eyes, so that detected images have a depth, so as to achieve stereoscopic imaging, to more clearly resolve obstacles. Furthermore, through a parallax between the binocular lenses, a distance of the obstacles is determined to more accurately avoid the obstacles, thereby overcoming the problems which exist in the current obstacle avoidance modules.

Figure 4:
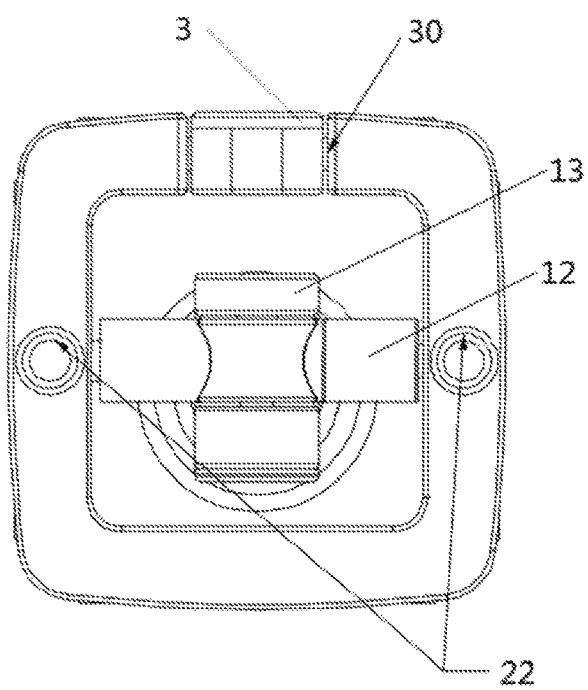
FIG. 4 is a bottom view of the obstacle avoidance device in FIG. 1.
Figure 5:
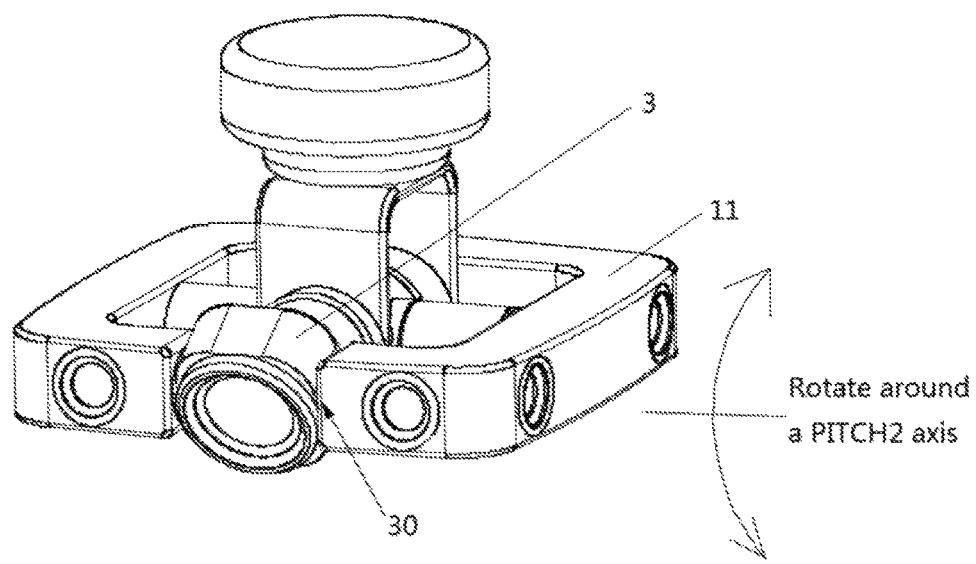
FIG. 5 is a three-dimensionally structural diagram of an obstacle avoidance device at a second rotation state according to the preferred embodiment of the present invention.
Figure 6:
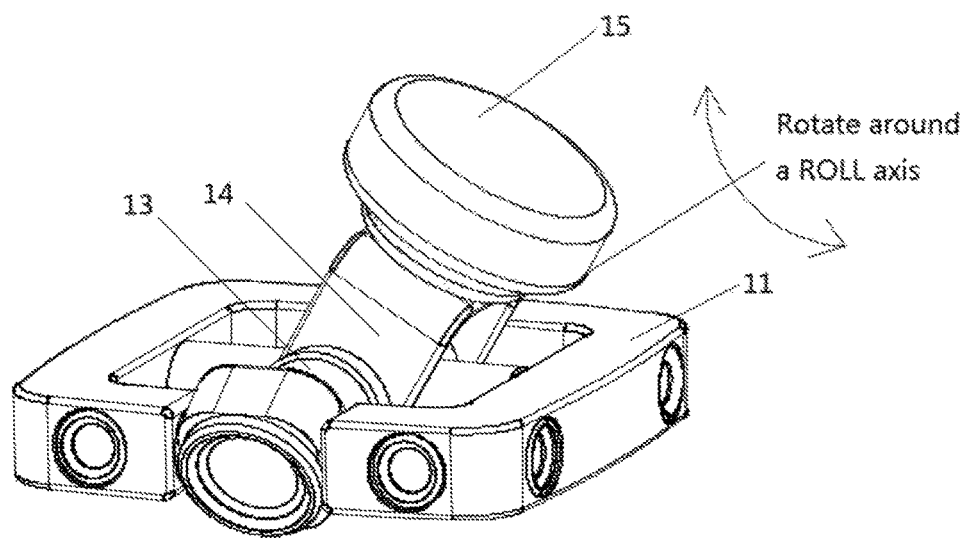
FIG. 6 is a three-dimensionally structural diagram of an obstacle avoidance device at a third rotation state according to the preferred embodiment of the present invention.

In one embodiment, referring to FIG. 4, the obstacle avoidance module 2 further comprises bottom obstacle avoidance lenses 22 which are a pair of binocular lenses but not as a limitation and is also able to be more. The bottom obstacle avoidance lenses 22 are arranged at a bottom of the stabilization holder 11 and faces downwardly, so as to achieve bottom obstacle avoidance. For example, in the process of UAV rising or falling, the obstacles in front of the UAV are detected to achieve the safe obstacle avoidance. Generally speaking, in the normal flight environment, there is no obstacle above the UAV, so no obstacle avoidance lens is set at a top of the obstacle avoidance device.

The stability of the obstacle avoidance module 2 is enhanced through the stabilization platform 1, an attitude angle relative to the ground is kept unchanged; due to the obstacles are generally fixed relative to the ground, as long as it is ensured that the attitude angle of the obstacle avoidance module 2 relative to the ground is unchanged, the obstacle information is able to be clearly captured. For example, in the flight process of the UAV, the attitude of the UAV is able to be arbitrarily changed, is also able to occur a large maneuver; a frame plane of the stabilization holder 11 always keeps level relative to the ground, so as to stably collect small obstacles at high resolution in the fight direction of UAV; of course, to detect big obstacles.

While the present invention has been described above with reference to preferred embodiments, it is not intended to be limiting of the claims, and any person skilled in the art will be able to make possible variations and modifications without departing from the spirit and scope of the present invention. Therefore, the protective scope of the present invention should be determined by the scope defined by the appended claims of the present invention.

What is claimed is:

1. An obstacle avoidance device for detecting surroundings of an unmanned mobile device, which comprises:
    a stabilization platform connected with the unmanned mobile device, which comprises a stabilizer for ensuring stably bearing at least one platform camera, a rotation shaft unit and a stabilization holder; and
    an obstacle avoidance module fixed with the stabilization platform, so as to reduce interferences to detect the surroundings by the obstacle avoidance module when the unmanned mobile device acts, wherein:
    the obstacle avoidance module is installed on the stabilization holder; the stabilization holder is movably connected with the unmanned mobile device through the rotation shaft unit, so that the obstacle avoidance module moves relatively to the unmanned mobile device and maintains an attitude when the unmanned mobile device acts;
    the obstacle avoidance module comprises a circumferential obstacle avoidance lens unit which is arranged at a periphery of the stabilization holder and faces towards an outside of the stabilization holder, so as to achieve omnidirectional obstacle avoidance;
    the circumferential obstacle avoidance lens unit comprises four pairs of binocular lenses which are respectively evenly distributed in each direction of the periphery of the stabilization holder.

2. The obstacle avoidance device, as recited in claim 1, wherein the stabilization holder comprises a frame structure with a gap, and the gap is configured to accommodate the platform camera.

3. The obstacle avoidance device, as recited in claim 2, wherein through a camera shaft, the platform camera is rotatably connected with the gap of the frame structure.

4. The obstacle avoidance device, as recited in claim 3, wherein one shaft of the rotation shaft unit and a frame plane of the frame structure are coplanar, the frame structure rotates around an axis of the coplanar plane.

5. An obstacle avoidance device for detecting surroundings of an unmanned mobile device, which comprises:
    a stabilization platform connected with the unmanned mobile device, which comprises a stabilizer for ensuring stably bearing at least one platform camera, a rotation shaft unit and a stabilization holder; and
    an obstacle avoidance module fixed with the stabilization platform, so as to reduce interferences to detect the surroundings by the obstacle avoidance module when the unmanned mobile device acts, wherein:
    the obstacle avoidance module is installed on the stabilization holder; the stabilization holder is movably connected with the unmanned mobile device through the rotation shaft unit, so that the obstacle avoidance module moves relatively to the unmanned mobile device and maintains an attitude when the unmanned mobile device acts;
    the obstacle avoidance module comprises a circumferential obstacle avoidance lens unit which is arranged at a periphery of the stabilization holder and faces towards an outside of the stabilization holder so as to achieve omnidirectional obstacle avoidance, and bottom obstacle avoidance lenses which are arranged at a bottom of the stabilization holder and faces downwardly so as to achieve bottom obstacle avoidance.

6. The obstacle avoidance device, as recited in claim 5, wherein the stabilization holder comprises a frame structure with a gap, and the gap is configured to accommodate the platform camera.

7. The obstacle avoidance device, as recited in claim 6, wherein through a camera shaft, the platform camera is rotatably connected with the gap of the frame structure.

8. The obstacle avoidance device, as recited in claim 7, wherein one shaft of the rotation shaft unit and a frame plane of the frame structure are coplanar, the frame structure rotates around an axis of the coplanar plane.

* * * * *